United States Patent [19]

Kondo et al.

[11] 4,019,403
[45] Apr. 26, 1977

[54] SHOCK ABSORBING TYPE STEERING DEVICE

[75] Inventors: Takeo Kondo, Toyota; Yoichi Hyodo, Takahama; Hiroyuki Ono, Anjo; Shiro Yuasa, Toyota, all of Japan

[73] Assignees: Toyota Jidosha Kogyo Kabushiki Kaisha, Toyota; Aisin Seiki Kabushiki Kaisha, Kariya, both of Japan

[22] Filed: Jan. 2, 1976

[21] Appl. No.: 646,071

[30] Foreign Application Priority Data

Jan. 14, 1975 Japan ............................ 50-6688[U]

[52] U.S. Cl. ............................... 74/492; 188/1 C
[51] Int. Cl.² ............................................. B62D 1/18
[58] Field of Search ............ 74/492, 493; 188/1 C

[56] References Cited

UNITED STATES PATENTS

| | | | |
|---|---|---|---|
| 3,365,189 | 1/1968 | Carlson | 188/1 C |
| 3,398,812 | 8/1968 | Peterson | 188/1 C |
| 3,483,768 | 12/1969 | Glass | 74/492 |
| 3,489,087 | 1/1970 | Soderberg | 188/1 C |
| 3,530,737 | 9/1970 | Higginbotham | 74/492 |
| 3,656,366 | 4/1972 | Somero | 74/492 |
| 3,659,835 | 5/1972 | Peterson | 188/1 C |
| 3,744,338 | 7/1973 | Komatsu et al. | 74/492 |

FOREIGN PATENTS OR APPLICATIONS 1,278,764  6/1972  United Kingdom ................ 74/492

*Primary Examiner*—Allan D. Hermann
*Attorney, Agent, or Firm*—Finnegan, Henderson, Farabow & Garrett

[57] ABSTRACT

A shock absorbing type steering device for use in a motor vehicle, comprising a shaft adapted to transmit a torque from a steering wheel to a steering gear, which shaft consists of a first solid shaft portion and a second hollow or cylindrical shaft portion. The second cylindrical shaft portion includes a small diameter portion and a large diameter portion. Part of the first solid shaft portion is rigidly fitted in the aforesaid small diameter portion of the second cylindrical shaft portion with the aid of shear pins, while a shock-absorbing resilient material is contained in the aforesaid large diameter portion of the second cylindrical shaft portion. The shock absorbing material is of such a property that it is ruptured due to stresses exceeding a given level. A passage leading from the interior of the aforesaid large diameter portion of the second cylindrical shaft portion to atmosphere runs either through the first solid shaft portion or through the second cylindrical shaft portion.

11 Claims, 16 Drawing Figures

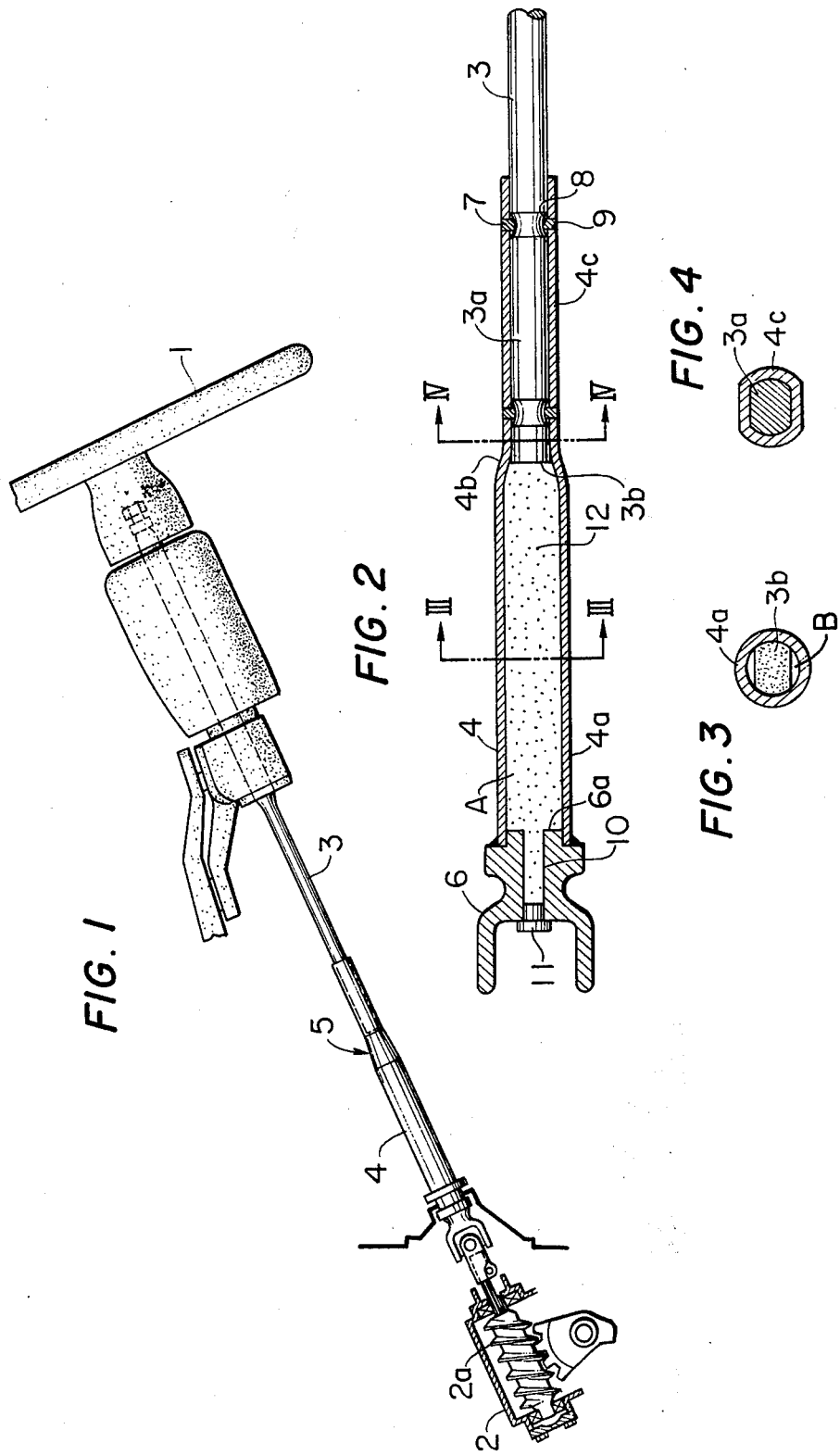

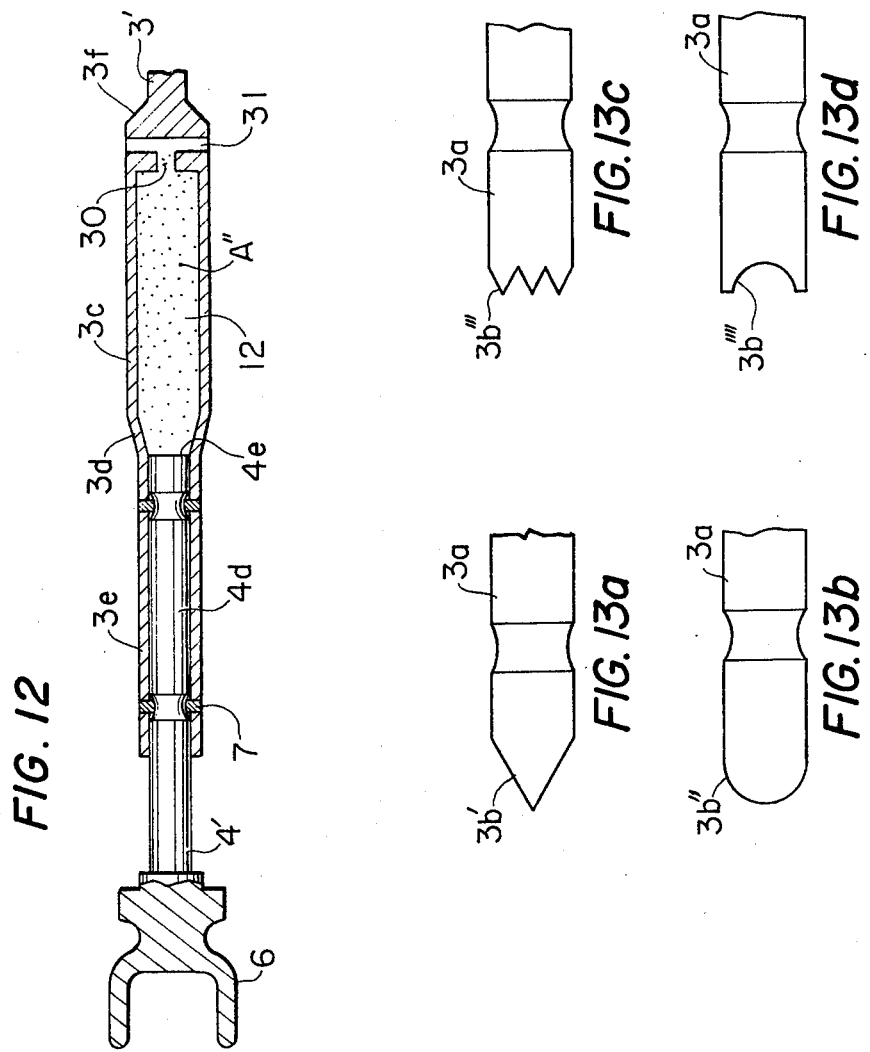

SHOCK ABSORBING TYPE STEERING DEVICE

BACKGROUND OF THE INVENTION

1. Field of the Invention

This invention relates to a shock absorbing type steering device which is so designed as to absorb a shock to be exerted on a driver, when the driver is bumped against a steering wheel, in the event of collision of vehicles such as motor vehicles, and more particularly to improvements in a steering post portion which may absorb shock energy.

2. Description of the Prior Art

According to a prior art shock absorbing type steering device, there is provided between a steering wheel and a steering gear a shaft which is divided into two parts, for transmitting a rotating torque of the steering wheel to a steering gear as well as for absorbing a shock in the event of collision of vehicles. To this end, however, the parts of aforesaid shaft are so coupled to each other as to be compressed upon collision of vehicles, while a metal column tube is placed around the shaft, which tube is adapted to cause plastic deformation due to an impact force to be created in the event of collision, thereby absorbing shock energy. With the shock absorbing type steering device described above, a steering action and a shock-absorbing action are attended upon separately, thus necessitating the use of an increased number of parts, with the resulting complexity in construction.

SUMMARY OF THE INVENTION

It is accordingly a principal object of the present invention to provide a shock absorbing type steering device for use in a motor vehicle, which is simple in construction and hence has fewer parts.

It is another object of the present invention to provide a shock absorbing type steering device of the type described, which presents a shock absorbing characteristic which enable smooth absorbing of a shock for a driver in the event of collision of vehicles.

It is a further object of the present invention to provide a shock absorbing type steering device of the type described, which permits a change in or adjustment of the energy absorbing characteristic at the initial stage of collision of vehicles.

According to the present invention, there is provided for attaining the aforesaid objects a shock absorbing type steering device for use in a motor vehicle, which comprises: a shaft for transmitting a torque from a steering wheel to a steering gear, the aforesaid shaft consisting of a first solid shaft portion and a second hollow or cylindrical shaft portion, part of the aforesaid solid shaft portion being fitted in part of the aforesaid cylindrical portion; shear pins interconnecting the first and second shaft portions thus engaged; and a resilient shock absorbing material filled in the second cylindrical shaft portion; and a passage leading from the interior of the second cylindrical portion to atmosphere, and running either through the first solid shaft portion or through the second cylindrical shaft portion.

According to another aspect of the present invention, the end of the first solid shaft portion which is partly inserted into the second cylindrical portion so as to close the shock absorbing material at one end thereof is formed into a shape which varies the load to be exerted on the shock absorbing material in the initial stage of collision of vehicles.

BRIEF DESCRIPTION OF THE DRAWINGS

FIG. 1 is a side view of the entire arrangement of a steering device according to the first embodiment of the invention;

FIG. 2 is a longitudinal cross-sectional view showing the essential part of the device;

FIG. 3 is a cross-sectional view taken along the line III—III of FIG. 2;

FIG. 4 is a cross sectional view taken along the line IV—IV of FIG. 2;

FIG. 12 is a longitudinal cross-sectional view of the fifth embodiment of the invention; and FIGS. 13 (a) to (d) are side views of the ends of solid shaft portions, which are to be inserted into part of cylindrical shaft portions.

DESCRIPTION OF THE PREFERRED EMBODIMENTS

Figure 6:
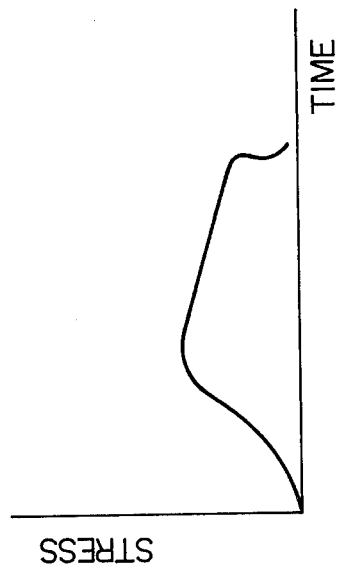
FIG. 6 is a plot illustrative of the load-bearing characteristic of a shock absorbing material.

Referring now to FIGS. 1 through 4 which show the first embodiment of the present invention, there is shown a steering wheel at 1, and at 5 a steering shaft which extends from the steering wheel 1 to a steering gear box 2. The steering shaft 5 consists of an upper shaft portion 3 and a lower shaft portion 4 which is telescopically fitted on part of the upper shaft portion 3. The upper shaft portion 3 is a solid, elongated shaft, to whose one end is secured the steering wheel 1, and includes a non-circular or flat solid shaft portion 3a having a considerable length, with two flat surfaces provided on the radially opposite sides thereof. The flat solid shaft portion 3a is formed with an end face 3b facing at a right angle to the axis of the shaft 3. The lower shaft portion 4 is an elongated hollow or cylindrical shaft portion consisting of a second portion or true cylindrical shaft portion 4a having a circular cross section and a length extending over half the entire length of the hollow shaft 4, and a first non-circular or flat cylindrical portion 4c having two flat surfaces on the radially opposite sides of the portion 4c. The non-circular or flat cylindrical shaft portion 4c has a cross-sectional area smaller than that of the second or cylindrical shaft portion 4a. Intermediate the true second or cylindrical shaft portion 4a and the first or flat cylindrical shaft portion 4c is a tapered portion 4b. Coupled to the end of the second or cylindrical shaft portion 4a is a bracket 6 which is linked to a steering gear 2a in the gear box 2. The both shafts 3, 4 are engaged with each other, with the flat solid shaft portion 3a inserted into the flat cylindrical shaft portion 4c in sliding relation, up to a position on the boundary between the tapered portion 4b and the flat cylindrical shaft portion 4c. A shear pin 7 having a given shear strength extends through the wall of the flat cylindrical shaft portion 4c of the hollow shaft 4 into engagement with a hole 8 in the upper shaft 3, while another shear pin 7 also extends through a hole 9 in the wall of the flat cylindrical shaft portion 4c into engagement with another hole 8 in the solid shaft 3. Thus, the solid shaft 3 rotates together with the hollow or cylindrical shaft 4, thereby transmitting a rotating torque from the steering wheel 1 to the steering gear 2a. The shear pins 7 maintain the height of the steering wheel 1 constant, when an axial force being applied to the shaft 3 is small relative to the shear strength of the shear pins 7. Extending through the bracket 6 at its center is an orifice or passageway 10 having a small diameter than that of the hollow shaft 4, with a plug 11 placed therein. The plug 11 is so designed as to be ejected outside under a predetermined force. In this manner, there is defined a closed space a surrounded with the vertical end face 3b of the solid shaft 3, the peripheral wall of the cylindrical shaft portion 4a of the hollow shaft 4, and the inner surface 6a of the bracket 6 and the inner end face of the plug 11. Contained in the space A is a shock absorbing material 12 such as for instance, silicon rubber, which is adapted to be ruptured under a given pressure, and presents desired resiliency and flow resistance.

Figure 5:
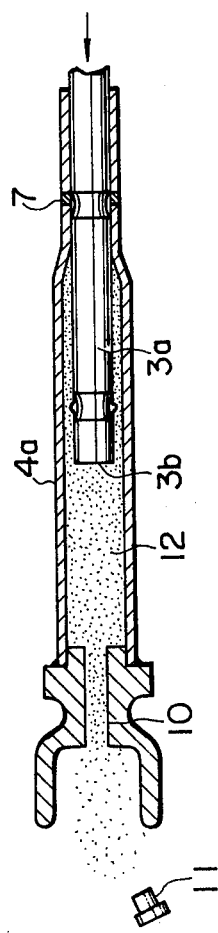
FIG. 5 is a longitudinal cross-sectional view of the steering device according to the first embodiment of the present invention, illustrating the operation thereof.

With the aforesaid arrangement, as long as an axial force being applied to the shaft portions 3, 4 is small relative to the shear strength of the shear pins 7, the solid or upper shaft 3 is rigidly coupled to the hollow or lower shaft 4, so that the shock absorbing material 12 is maintained in a static condition, and a normal steering action of the steering wheel 1 may be carried out. However, in the event of collision of vehicles, where a driver is bumped against the steering wheel 1 on his breast, then an abnormally great impact force is applied to the shaft portions 3, 4 in their axial directions. This causes the failure of shear pins 7, so that, as shown in FIG. 5, the flat solid shaft portion 3a of the upper shaft portion 3 is poked into the shock absorbing material contained in the true cylindrical portion 4a of the lower shaft portion 4. This causes compression in the shock absorbing material 12 to an extent commensurate to the extent of the flat solid shaft portion 3a being poked into the shock absorbing material 12. In this respect, the shock absorbing material 12 is ruptured and forced into a space B defined between the inner peripheral surface of the true cylindrical portion 4a and the outer peripheral surface of the flat solid portion 3a being thus poked into the shock absorbing material 12. As is clear from this, the shock energy may be absorbed by the aforesaid rupture, resiliency and flow resistance of the shock absorbing material 12 flowing into the space B. When a compression force being exerted on the shock absorbing material 12 reaches a given level, then the plug 11 is forced out, with the result that the shock absorbing material 12 flows through the orifice or passageway 10 outwards. In this respect, the shock energy may be absorbed in a smooth manner due to the initial low load condition as shown in FIG. 6 as well as due to the resistance of the continuing flow of the shock absorbing material.

Figure 7:
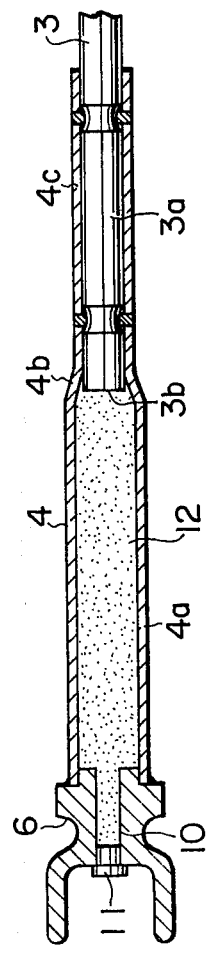
FIG. 7 is a longitudinal cross-sectional view of the steering device according to the second embodiment of the invention.

Turning now to FIG. 7 which shows the second embodiment of the invention, wherein the non-circular flat solid shaft portion 3a of the solid or upper shaft 3 is placed within the first or flat cylindrical shaft portion 4c of the hollow lower shaft 4, with the head 3b of the flat solid shaft portion 3a maintained biased internally towards the second or true cylindrical shaft portion 4a of the hollow or lower shaft 4 to a further extent or more deeply, as compared with the head of the flat solid shaft portion 3a as shown in FIG. 2. This varies the amount of the shock absorbing material 12 to be contained in the true cylindrical shaft portion 4a and hence the condition of compression of the shock absorbing material 12, particularly, the energy absorbing condition in the initial stage of collision.

Figure 8:
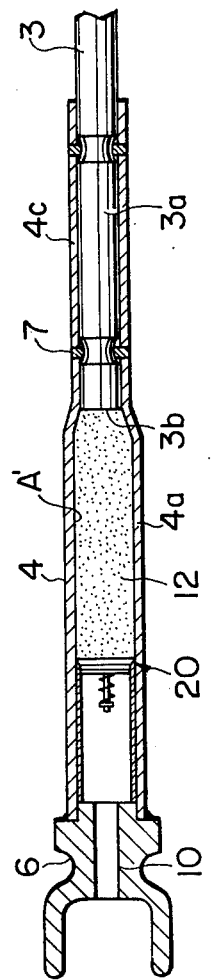
FIG. 8 is a longitudinal cross-sectional view illustrative of the third embodiment of the present invention.
Figure 9:
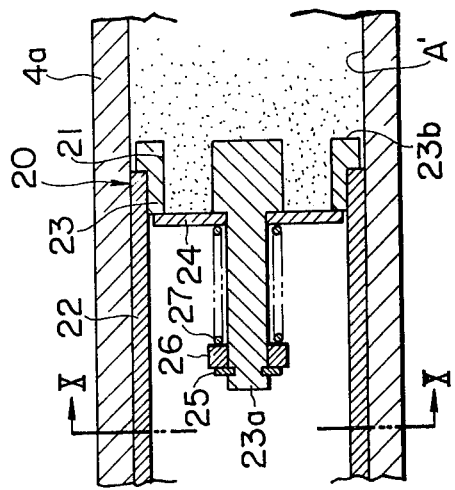
FIG. 9 is an enlarged, longitudinal cross-sectional view of the essential part of the third embodiment.
Figure 10:
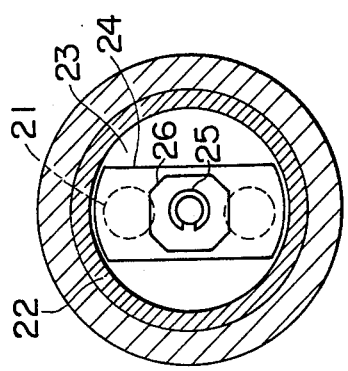
FIG. 10 is a transverse cross-sectional view taken along the line X—X of FIG. 9.

FIGS. 8 through 10 show the third embodiment of the steering device according to the present invention. In this case, the plug 11 fitted in the outside of orifice 10, as shown in FIGS. 2 and 7, is omitted, and a valve 20 is provided within the second or true cylindrical shaft portion 4a of the second or lower shaft 4 but on the inside of the orifice or passageway 10, instead. The valve 20, as seen in FIGS. 9 and 10 consists of: a valve seat 23 having a plurality of through-holes 21 and fitted in a sleeve 22 which has been press-fitted in the true cylindrical shaft portion 4a; a valve body 24 having a size which sufficiently closes the aforesaid through-holes 21, the valve body 24 being adapted to be opened and closed on the inside of the orifice 10; a spring mount 26 which is fixed in position by means of a snap ring 25 which abuts an upset head 23a of a stem of the valve seat 23; and a spring 27 confined between the mount 26 and the back surface of a valve body 24. In a similar manner to that of the first embodiment, a closed space A' is defined within the true cylindrical shaft portion 4a of the lower shaft 4, being bounded by the valve 20 at the one end of the space A'. Thus, when the shock absorbing material 12 contained in the true cylindrical shaft portion 4a is subjected to compression due to an abnormal shock produced at the time of collision of vehicles, then the valve body 24 is moved against the bias force of the spring 27 so as to open the through-holes 21, so that the shock absorbing material 12 is forced out through an interstice defined between the valve seat 23 and the valve body 24, thereby absorbing the shock energy. Thus, the greater the compression force being exerted on the shock absorbing material, the larger the extent of the valve body 24 being moved, with the accompanying increase in the size of an interstice between the valve seat 23 and the valve body 24. This accelerates the absorption of shock energy due to the flow resistance of the shock absorbing material 12.

Figure 11:
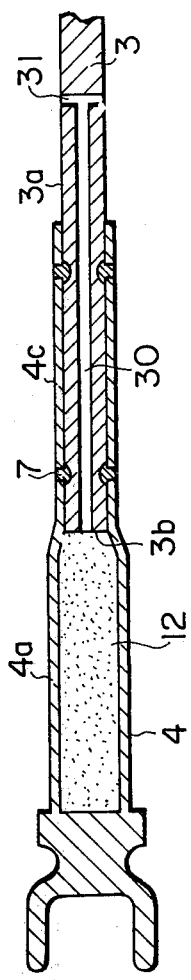
FIG. 11 is a longitudinal cross-sectional view of the fourth embodiment of the invention.

FIG. 11 shows the fourth embodiment of the steering device of the present invention. In this case, there are omitted the plug 11, orifice 10 and valve 20 shown in the preceding embodiments. Instead, there is provided through the solid upper shaft 3 a passage 30 running from the end face 3b through the body of the upper shaft 3 and branched into passages 31 which are located on the side of the solid shaft 3 proximate the steering wheel 1 and open to atmosphere, i.e., a 'T' shaped passage. In the event of collision of vehicles, the shock absorbing material 12 flows through the passage 30 and then into passages 31 to atmosphere, subsequent to the failure of the shear pins 7. In this respect, the shock absorbing material 12 turns its flow direction at the intersecting point of the two passages 30 and 31, thereby creating an increased flow resistance, with the resulting further enhanced absorption of shock energy. The provision of the thus intersecting passages 30 and 31 dispenses with the provision of the aforesaid valve 20, valve body 24 and plug 11, thus reducing the number of parts to be used in the steering device. In addition, the load created in the shock absorbing material 12 in the initial stage of collision is effectively reduced, because of the shock absorbing material flows through the passages 31 to the outside.

FIG. 12 shows still another embodiment of the steering device, in which the shock absorbing material 12 is contained in the hollow upper shaft 3', whereas in the preceding embodiments the shock absorbing material 12 is contained in the hollow, lower shaft 4. With this embodiment, the hollow, upper shaft 3' includes, as viewed from its end back to the steering wheel 1, a second or flat cylindrical shaft portion 3e, a tapered shaft portion 3d, and a true first or cylindrical shaft portion 3c, while the solid, lower shaft 4' includes a flat solid shaft portion 4d and an end face 4e on the side opposite the bracket 6. Thus, the flat solid shaft portion 4d of the lower shaft 4' is fitted in the flat cylindrical shaft portion 3e of the upper shaft 3', with the end face 4e located in a given position within the true cylindrical portion 3c. Like the preceding embodiment, shear pins 7 are provided in a manner to run through the wall of the flat cylindrical shaft portion 3e into engagement with holes provided in the periphery of the flat solid shaft portion 4d. Passages 30 and 31 are provided in a portion proximate the steering wheel 1 of the cylindrical shaft portion 3c of the upper shaft 3' in the same manner as in the embodiment of FIG. 11. A shock absorbing material 12 is contained in a space A'' within the true cylindrical portion 3c of the upper shaft 3', as shown. Like the preceding case, in the event of collision of vehicles, the shear pins 7 fail and then the upper shaft 3' is forced towards the lower shaft 4' thereon together with the steering wheel 1 due to a driver's bumping against the steering wheel 1. Then, the flat solid shaft portion 4d of the lower shaft 4' makes ingress into the shock absorbing material 12 contained in the true cylindrical portion 3c of the upper shaft 3', forcing the shock absorbing material to flow through the passage 30, then through the passages 31 and to atmosphere, with the resulting absorption of shock energy.

FIG. 13 shows various shapes of the ends of flat solid shaft portions, although the flat end faces thereof are shown in the preceding embodiments. Shown at FIG. 13 (a) is a tapered end 3b', at FIG. 13(b) a semi-spherical end 3b'', at FIG. 13 (c) a saw-tooth-shaped end 3b''', and at FIG. 13(d) an end 3b'''' having a concave semi-spherical surface. The various shapes of the ends of flat solid shaft portions vary the load-bearing characteristic of the shock absorbing material in the initial stage of collision of vehicles. In addition, such a load characteristic may be varied by compressing the shock absorbing material 12 to some extent beforehand.

As is apparent from the foregoing description, the steering device according to the present invention may smoothly absorb shock energy according to a simple construction, thus dispensing with the use of the prior art column tube and the like. In addition, silicon rubber used as a shock absorbing material has a property which may reduce a load to be exerted thereon in the initial stage of collision. In addition, the flat solid shaft portion 3a or 4d having a small cross sectional area is so designed as to make ingress into the true cylindrical portion 4a or 3c having a large cross sectional area, so that a load to be exerted on the shock absorbing material may be smoothly reduced, particularly at the initial stage of collision of vehicles, thus presenting improved safety for a driver.

Although the present invention has been described with respect to specific details of certain embodiments thereof, it is not intended that such details be limitations upon the scope of the invention, except insofar as set forth in the following claims.

What is claimed is:

1. A shock absorbing type steering device for transmitting torque from a steering wheel to a steering gear in a motor vehicle, comprising:
 a. a solid, axially straight shaft, an end portion thereof having a non-circular cross-section;
 b. a hollow shaft, a first portion of said hollow shaft having a cross-sectional shape substantially conforming to the cross-sectional shape of the non-circular portion of said solid shaft for mating said shafts and forming a steering column and a second portion of said hollow shaft having a cross-sectional area greater than the cross-sectional area of the first portion of said hollow shaft;
 c. shear pins interconnecting the non-circular portion of said solid shaft with the first portion of said hollow shaft;
 d. a bracket for joining said steering column to said steering gear;
 e. a rupturable, resilient, shock absorbing material contained within said second portion of said hollow shaft; and
 f. a passageway between the interior of the second portion of said hollow shaft and the atmosphere for ejection of said material.

2. The shock absorbing type steering device as set forth in claim 1, wherein said bracket is attached to the second portion of said hollow shaft and wherein said passageway passes from the interior of the second portion of said hollow shaft through said bracket to the atmosphere.

3. The shock absorbing type steering device as in claim 1 wherein the end of the non-circular portion of said solid shaft has a flat surface perpendicular to the longitudinal axis of said solid shaft.

4. The shock absorbing type steering device as in claim 2 also including a removable plug normally closing said passageway, said plug being ejectable when subjected to pressure from said shock absorbing material within said hollow shaft.

5. The shock absorbing type steering device as set forth in claim 2 also including a valve within said second portion of said hollow shaft dividing the interior thereof into two chambers, one of which contains said resilient shock absorbing material, and the other which is in communication with said passageway passing through said bracket, said valve enhancing the reduction in a load exerted on said shock absorbing material at the initial stage of collision of vehicles.

6. The shock absorbing type steering device as set forth in claim 1, wherein said bracket is attached to one end of the second portion of said hollow shaft, and wherein said passageway passes axially through said solid shaft to the atmosphere.

7. The shock absorbing type steering device as set forth in claim 6, wherein said passageway includes a main passage and branched passages in said solid shaft remote from said hollow shaft, said branched passages being at right angles to said main passage providing a "T[ form exit to the atmosphere.

8. The shock absorbing type steering device as set forth in claim 1, wherein said bracket is attached to said solid shaft, wherein said hollow shaft is coupled to said steering wheel, and wherein said passageway passes from the interior of said hollow shaft through the end of the second portion of said hollow shaft remote from said solid shaft to the atmosphere.

9. The shock absorbing type steering device as set forth in claim 1, wherein the end of the non-circular portion of said solid shaft extends into part of the interior of the second portion of said hollow shaft.

10. The shock absorbing type steering device as set forth in claim 1, wherein the end of the non-circular portion of said solid shaft is shaped into a non-flat surface in contact with said resilient, shock absorbing material.

11. A shock absorbing type steering device for transmitting torque from a steering wheel to a steering gear in a motor vehicle, comprising:
   a. an elongated solid shaft being axially straight and having a first end for attachment to said steering wheel and a second end, a portion of said solid shaft proximate said second end having a non-circular cross-section;
   b. an elongated hollow shaft including a first portion having a non-circular cross-section substantially conforming to the cross-section of the non-circular portion of said solid shaft for mating said shafts and forming a steering column, and a second portion having a cross-sectional area greater than the cross-sectional area of the first portion;
   c. shear pins interconnecting the non-circular portion of said solid shaft with the first portion of said hollow shaft;
   d. a bracket attached to the end of said second portion of said hollow shaft for joining said steering column to said steering gear;
   e. a rupturable, resilient, shock absorbing material contained within the second portion of said hollow shaft;
   f. a passageway open at one end to the interior of said second portion of said hollow shaft and open at the other end to the atmosphere, said passageway passing through said bracket; and
   g. a removable plug closing the end of said passageway open to the atmosphere, said plug being ejectable when subjected to pressure from said shock absorbing material within said hollow shaft.

* * * * *